US012704869B2

(12) United States Patent
Ke et al.

(10) Patent No.: US 12,704,869 B2
(45) Date of Patent: Aug. 11, 2026

(54) ROCKER DEVICE

(71) Applicant: SHANGHAI FLYDIGI ELECTRONICS TECHNOLOGY, CO., LTD., Shanghai (CN)

(72) Inventors: Shanpeng Ke, Shanghai (CN); Hang Tian, Shanghai (CN); Yawu Zhang, Shanghai (CN); Wei Huang, Shanghai (CN)

(73) Assignee: SHANGHAI FLYDIGI ELECTRONICS TECHNOLOGY, CO., LTD., Shanghai (CL)

(*) Notice: Subject to any disclaimer, the term of this patent is extended or adjusted under 35 U.S.C. 154(b) by 222 days.

(21) Appl. No.: 18/603,285

(22) Filed: Mar. 13, 2024

(65) Prior Publication Data

US 2025/0238051 A1 Jul. 24, 2025

Related U.S. Application Data

(63) Continuation of application No. PCT/CN2024/079670, filed on Mar. 1, 2024.

(30) Foreign Application Priority Data

Jan. 19, 2024 (CN) ......................... 202420143375.2

(51) Int. Cl.
*H01H 25/04* (2006.01)
*G05G 5/05* (2006.01)
*G05G 9/047* (2006.01)

(52) U.S. Cl.
CPC ............... *G05G 5/05* (2013.01); *G05G 9/047* (2013.01); *G05G 2009/04781* (2013.01); *H01H 25/04* (2013.01)

(58) Field of Classification Search
CPC .... H01H 23/143; H01H 23/30; H01H 23/025; H01H 2300/03; H01H 23/145;
(Continued)

(56) References Cited

U.S. PATENT DOCUMENTS 6,283,886 B1 9/2001 Fahrzeugteile
9,052,736 B2 6/2015 Kreider et al.
(Continued)

FOREIGN PATENT DOCUMENTS

CN 203220989 U 10/2013
CN 204985846 U 1/2016
(Continued)

OTHER PUBLICATIONS

International Search Report, International Application No. PCT/CN2024/079670, International mailed Oct. 17, 2024 (21 pages).
(Continued)

*Primary Examiner* — Ahmed M Saeed

(57) ABSTRACT

The present application provides a rocker device. The rocker device includes a rocker, a bias component, an adjustable reset assembly, and a toggle component. The rocker is provided with a pressing part. The bias component includes a first end and a second end opposite to each other, the first end is in contact with the pressing part, and the second end is capable of offsetting. The adjustable reset assembly is disposed on the second end, and the adjustable reset assembly is configured to drive the second end of the bias component to reset. The rocker rotates in the toggle component, and the toggle component is configured to act on the adjustable reset assembly to adjust a reset force. The rocker device of the present application may adjust the operating force through the toggle component, which may meet the diverse experience needs of a user.

16 Claims, 6 Drawing Sheets

(58) Field of Classification Search
CPC .. H01H 2221/016; H01H 23/14; H01H 23/04; H01H 23/168; H01H 2221/018; H01H 23/02; H01H 23/12; H01H 23/003; H01H 23/146; H01H 23/16; H01H 23/20; H01H 23/28; H01H 23/00; H01H 23/148; H01H 23/24; H01H 23/26; G05G 5/05; G05G 9/047; G05G 2009/04781; G05G 2009/04718; G05G 2009/04766; G05G 1/08
See application file for complete search history.

(56) References Cited

U.S. PATENT DOCUMENTS

| | | | | |
|---|---|---|---|---|
| 9,868,058 | B2 * | 1/2018 | Gassoway | G06F 3/033 |
| 12,121,799 | B2 * | 10/2024 | Summa | A63F 13/837 |
| 12,370,438 | B2 * | 7/2025 | Hu | A63F 13/24 |
| 2017/0001106 | A1 * | 1/2017 | Gassoway | G05G 9/047 |

FOREIGN PATENT DOCUMENTS

| | | | |
|---|---|---|---|
| CN | 212593931 | U | 2/2021 |
| CN | 114237341 | A | 3/2022 |
| CN | 117055687 | A | 11/2023 |
| CN | 220232317 | U | 12/2023 |
| KR | 20200001468 | U | 7/2020 |
| WO | 2020129442 | A1 | 6/2020 |

OTHER PUBLICATIONS

Japanese First Notice of Reasons for Refusal, Japanese Patent Application No. 2024-525555, mailed Jan. 20, 2026 1 (8 pages).

* cited by examiner

ROCKER DEVICE

CROSS-REFERENCE TO RELATED APPLICATIONS

The present application is a continuation of International Patent Application No. PCT/CN2024/079670, filed Mar. 1, 2024, which claims priority to Chinese Patent Application No. 202420143375.2, filed Jan. 19, 2024, both of which are herein incorporated by reference in their entirety.

TECHNICAL FIELD

The present disclosure relates to the technical field of controllers, and in particular to a rocker device.

BACKGROUND

The rocker device is a widely used control device in a product, such as a game controller and a drone controller, etc. The existing rocker device generally includes a rocker and a reset mechanism. The rocker may be pushed by a user to generate control instruction, and the reset mechanism may drive the rocker to automatically reset. However, a reset force of the existing rocker device is generally unable to be adjusted, and a single operating force cannot meet the diverse experience needs of the user.

SUMMARY OF THE DISCLOSURE

The present disclosure provides a rocker device. The rocker device includes a rocker, a bias component, an adjustable reset assembly, and a toggle component. The rocker is provided with a pressing part. The bias component includes a first end and a second end opposite to each other, the first end is in contact with the pressing part, and the second end is capable of offsetting. The adjustable reset assembly is disposed on the second end, and the adjustable reset assembly is configured to drive the second end of the bias component to reset. The rocker is configured to rotate in the toggle component, and the toggle component is configured to act on the adjustable reset assembly to adjust a reset force.

In some embodiments, the adjustable reset assembly includes an adjusting component that is spaced apart from the second end, and the adjusting component and the toggle component mesh with each other in a lockable manner.

In some embodiments, a first meshing part is disposed on a periphery of the toggle component, a second meshing part is disposed on a periphery of the adjusting component, and the first meshing part meshes with the second meshing part.

In some embodiments, the adjusting member includes an adjusting part and a connecting part, one end of the connecting part is equipped with the adjusting part, the other end of the connecting part passes through the second end, and the second meshing part is disposed on a periphery of the adjusting part.

In some embodiments, the rocker device further includes a support base, and the connecting part passes through the second end and is connected to the support base.

In some embodiments, the adjustable reset assembly includes a reset component, the reset component is disposed between the adjusting component and the second end, one end of the reset component is connected to the adjusting component, and the other end of the reset component is connected to the second end.

In some embodiments, the rocker device includes a support base and an upper cover, the upper cover is disposed on the support base, the upper cover and the toggle component are coaxial and sleeved on the rocker, the toggle component is located on a side of the upper cover away from the bias component, and the toggle component is rotatably connected to the upper cover.

In some embodiments, a gear protrusion is disposed on the periphery of the toggle component, a plurality of gear slots are spaced apart from each other and disposed on an inner wall of the upper cover, and the gear protrusion is detachably embedded in one of the plurality of gear slots.

In some embodiments, an accommodating groove is defined on the side of the upper cover away from the bias component, and the toggle component is installed in the accommodating groove. The accommodating groove includes a bottom wall and a side wall, and the plurality of gear slots are spaced apart from each other and disposed on the side wall. A support protrusion is disposed on the bottom wall and between adjacent two of the plurality of gear slots, and the support protrusion is configured to support the toggle component.

In some embodiments, the plurality of gear slots include a first gear slot and a second gear slot, the first gear slot and the second gear slot extend along an axial direction of the upper cover, a limit wall is disposed on one end of the first gear slot away from the bias component, and the gear protrusion is limited to the limit wall along the axial direction of the upper cover.

In some embodiments, a first rotation limit part is disposed on the toggle component, and a second rotation limit part and a third rotation limit part are disposed on the upper cover. The adjusting component is located in a first position and a second position. When the adjusting component moves to the first position, the first rotation limit part is limited to the second rotation limit part. When the adjusting component moves to the second position, the first rotation limit part is limited to the third rotation limit part.

In some embodiments, the rocker device further includes a rocker cap, the rocker cap is sleeved on the rocker, and the rocker cap is located on the side of the upper cover away from the bias component. An avoidance groove is defined on a side of the rocker cap facing towards the upper cover, a limit protrusion is disposed on a circumference of an inner wall of the avoidance groove, and an abutting part is disposed on a circumference of a side of the upper cover facing towards the rocker cap. When the rocker is tilted to a preset angle, the limit protrusion is abutted against the abutting part.

In some embodiments, the rocker device further includes a support base, an upper cover, and a limit ring. The upper cover and the limit ring are disposed on the support base. The upper cover, the limit ring, and the toggle component are coaxial and sleeved on the rocker. The limit ring is located on a side of the upper cover away from the bias component, the toggle component is located on a side of the limit ring away from the bias component, and the toggle component is rotatably connected to the limit ring.

In some embodiments, the rocker device further includes a rocker cap, the rocker cap is sleeved on the rocker, and the rocker cap is disposed between the upper cover and the limit ring. The limit ring includes a limit surface surrounding the rocker. When the rocker is tilted to a preset angle, a periphery of the rocker cap is abutted against the limit surface.

The present disclosure further provides a rocker device including a rocker, a rocker cap, a bias component, an adjustable reset assembly, and a toggle component. The rocker is provided with a pressing part. The rocker cap is sleeved on the rocker. The bias component includes a first end and a second end opposite to each other, and the first end is in contact with the pressing part, and the second end is capable of offsetting. The adjustable reset assembly is disposed on the second end, and the adjustable reset assembly is configured to drive the second end of the bias component to reset. The adjustable reset assembly includes an adjusting component and a reset component, and the reset component is disposed between the adjusting component and the second end. The rocker is configured to rotate in the toggle component, and the toggle component is configured to act on the adjustable reset assembly to adjust a reset force.

BRIEF DESCRIPTION OF THE DRAWINGS

In order to more clearly illustrate the technical solutions in some embodiments of the present disclosure, hereinafter, a brief introduction will be given to the accompanying drawings that are used in the description of some embodiments. Obviously, the accompanying drawings in the description below are merely some embodiments of the present disclosure. For those of ordinary skill in the art, other accompanying drawings may be obtained based on these accompanying drawings without any creative efforts.

DETAILED DESCRIPTION

The technical solutions in some embodiments of the present disclosure may be clearly and completely described in conjunction with accompanying drawings in some embodiments of the present disclosure. Obviously, the described embodiments are only a part of the embodiments of the present disclosure, and not all embodiments. Based on the embodiments in the present disclosure, all other embodiments obtained by those of ordinary skill in the art without creative effort are within the scope of the present disclosure.

The reference to "embodiment" in the present disclosure means that, specific features, structures, or characteristics described in conjunction with some embodiments may be included in at least one embodiment of the present disclosure. This phrase appearing in various positions in the specification does not necessarily refer to the same embodiment, nor is it an independent or alternative embodiment that is mutually exclusive with other embodiments. Those of ordinary skill in the art explicitly and implicitly understand that the embodiments described in the present disclosure may be combined with other embodiments.

The rocker device provided in the present disclosure may be explained in detail with some embodiments.

Figure 1:
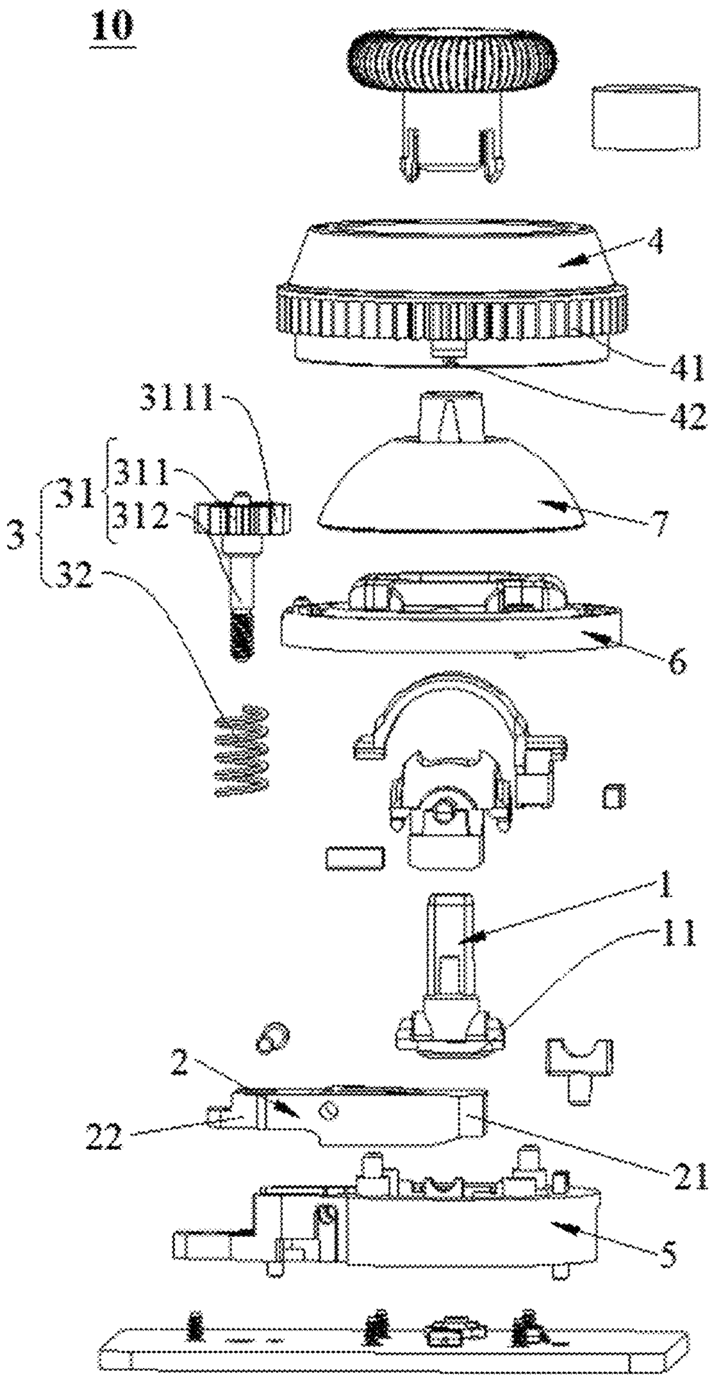
FIG. 1 is an exploded schematic view of a rocker device in an embodiment of the present disclosure.
Figure 2:
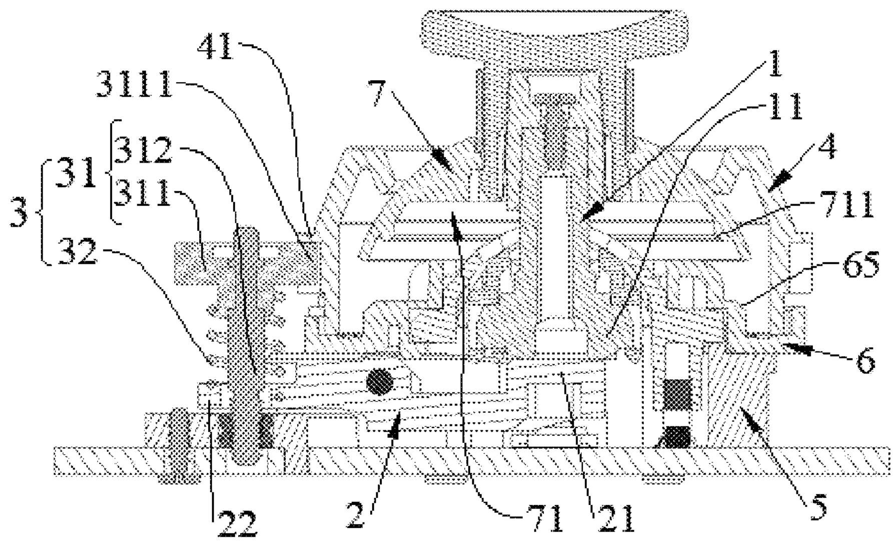
FIG. 2 is a cross-sectional schematic view of the rocker device in an embodiment of the present disclosure.
Figure 3:
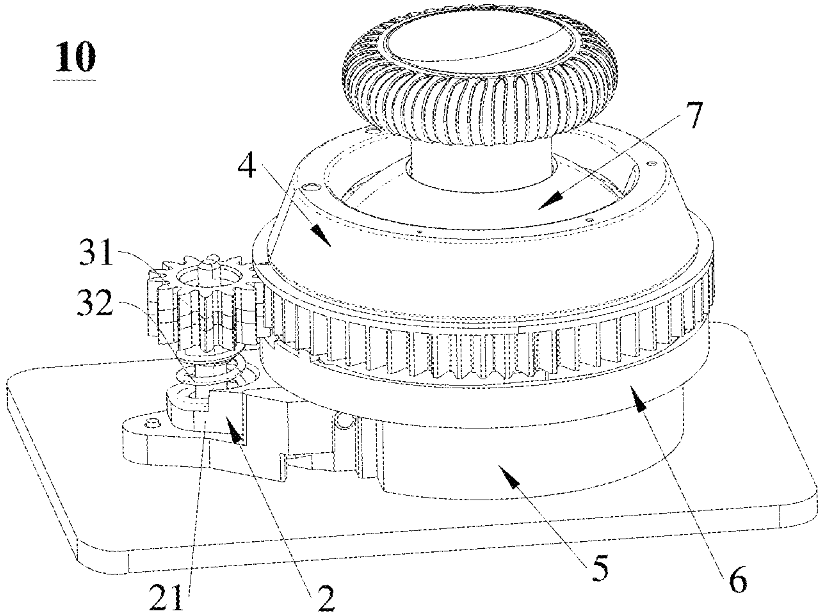
FIG. 3 is a structural schematic view of the rocker device in an embodiment of the present disclosure.

As illustrated in FIGS. 1 to 3, FIG. 1 is an exploded schematic view of a rocker device in an embodiment of the present disclosure, FIG. 2 is a cross-sectional schematic view of the rocker device in an embodiment of the present disclosure, and FIG. 3 is a structural schematic view of the rocker device in an embodiment of the present disclosure. The present disclosure provides a rocker device 10. The rocker device 10 includes a rocker 1, a bias component 2, an adjustable reset assembly 3, and a toggle component 4. The rocker 1 includes a pressing part 11. The bias component 2 includes a first end 21 and a second end 22 opposite to each other. The first end 21 is in contact with the pressing part 11. The second end 22 may be capable of offsetting. The adjustable reset assembly 3 is disposed on the second end 22. The adjustable reset assembly 3 may apply a reset force to the second end 22. The adjustable reset assembly 3 is configured to drive the second end 22 of the bias component 2 to reset. The rocker 1 is configured to rotate inside the toggle component 4. The toggle component 4 is configured to act on the adjustable reset assembly 3 to adjust the reset force.

In some embodiments, the adjustable reset assembly 3 continuously applies the reset force to the second end 22. The reset force keeps the second end 22 in a reset position. The second end 22 drives the first end 21 to remain in the reset position, thereby keeping the rocker 1 in the reset position. When a user pushes the rocker 1, an external force applied by the user needs to overcome the reset force of the adjustable reset assembly 3. When the external force is greater than the reset force, the rocker 1 is tilted under the action of the external force. The pressing part 11 of the rocker 1 presses the first end 21 and drives the second end 22 to offset. When the toggle component 4 changes the reset force of the adjustable reset assembly 3, the user needs to overcome the changed reset force when pushing the rocker 1. The rocker 1 forms different force feedback.

Through the above settings, the reset force applied by the adjustable reset assembly 3 to the second end 22 may be adjusted by the toggle component 4, thereby causing a change in the reset force transmitted from the second end 22 to the first end 21. When the rocker 1 is operated, the force feedback from the first end 21 changes accordingly. An operating force of the rocker device 10 may be flexibly adjusted to meet the diverse experience needs of the user.

A specific way of the toggle component 4 adjusting the reset force of the adjustable reset assembly 3 may be set according to the actual situation. In an embodiment, the adjustable reset assembly 3 drives the second end 22 to reset through an elastic force. The toggle component 4 may change a position of the adjustable reset assembly 3, making the adjustable reset assembly 3 close to or away from the second end 22. When the adjustable reset assembly 3 is close to or away from the second end 22, the elastic force applied by the adjustable reset assembly 3 to the second end 22 varies with a distance. In another embodiment, the adjustable reset assembly 3 drives the second end 22 to reset through a magnetic repulsion. The toggle component 4 may change a magnetic field strength of the adjustable reset assembly 3. When the magnetic field strength of the adjustable reset assembly 3 changes, the magnetic repulsion between the adjustable reset assembly 3 and the second end 22 changes.

In an embodiment, the adjustable reset assembly 3 includes an adjusting component 31. The adjusting component 31 is spaced apart from the second end 22. The adjusting component 31 and the toggle component 4 may mesh with each other in a lockable manner.

In some embodiments, the user may operate the toggle component 4 to rotate, and the toggle component 4 may drive the adjusting component 31 to move through a meshing structure. When the adjusting component 31 moves, the reset force of the adjustable reset assembly 3 changes. The adjusting component 31 may be locked or unlocked with the toggle component 4. When the adjusting component 31 is locked with the toggle component 4, the adjusting component 31 cannot move to be close to or away from the second end 22. The reset force of the adjustable reset assembly 3 remains unchanged. When the adjusting component 31 is unlocked with the toggle component 4, the adjusting component 31 may move to be close to or away from the second end 22. The reset force of the adjustable reset assembly 3 varies with the distance between the adjusting component 31 and the second end 22.

Through the above settings, the toggle component 4 may drive the adjusting component 31 to move through a meshing effect, thereby changing the reset force of the adjustable reset assembly 3. The rocker device 10 may stably and efficiently adjust the operating force. Furthermore, the adjusting component 31 may be locked with the toggle component 4 after adjusting to the required reset force, and the reset force may be maintained at a fixed size and the reset force does not change. The rocker device 10 is stable in use.

A locking mode of the adjusting component 31 and the toggle component 4 may be set according to the actual situation. In an embodiment, one end of the adjusting component 31 is equipped with a locking structure. The locking structure may allow the adjusting component 31 to only rotate and not directly translate along an axial direction. The adjusting component 31 may be locked by the locking structure along the axial direction. In another embodiment, the toggle component 4 is equipped with the locking structure. The locking structure may limit the rotation or axial movement of the toggle component 4. When the toggle component 4 cannot rotate, the adjusting part 31 cannot rotate due to the meshing effect, and the adjusting component 31 is located and limited in toggle component 4 along the axial. Thus, the position of the adjusting component 31 is locked.

As illustrated in FIGS. 1 to 3, in an embodiment, a first meshing part 41 is disposed on a periphery of the toggle component 4. A second meshing part 3111 is disposed on a periphery of the adjusting component 31. An axis of the toggle component 4 may be parallel to an axis of the adjusting part 31. The first meshing part 41 meshes with the second meshing part 3111. Thus, the toggle component 4 and the adjusting member 31 mesh with each other through the periphery of the toggle component 4 and the periphery of the adjusting member 31, and the toggle component 4 and the adjusting member 31 may be disposed with different axes. The structural of the rocker device 10 may be flexibly designed.

The first meshing part 41 meshes with the second meshing part 3111 in a straight teeth meshing manner or a bevel teeth meshing manner, etc., which are not limited in the present disclosure. When the first meshing part 41 meshes with the second meshing part 3111 in the straight teeth meshing manner, the toggle component 4 may drive the adjusting part 31 to rotate. During rotation of the adjusting component 31, the adjusting component 31 may be close to or away from the second end 22 through structures, such as threads. When the first meshing part 41 meshes with the second meshing part 3111 in the bevel teeth meshing manner, the toggle component 4 may drive the adjusting part 31 to rotate. The adjusting component 31 may be directly driven by the bevel teeth of the toggle component 4 to be close to or away from the second end 22.

Furthermore, the adjusting component 31 includes an adjusting part 311 and a connecting part 312. One end of the connecting part 312 is equipped with the adjusting part 311, and the other end of the connecting part 312 passes through the second end 22. The adjusting part 311 is spaced apart from the second end 22. The second meshing part 3111 is located on the periphery of the adjusting part 311.

Through the above settings, when the toggle component 4 drives the adjusting part 311 to move through the first meshing part 41, the connecting part 312 may guide the movement of the adjusting part 311. The adjusting part 311 may be close to or away from the second end 22 more stably, and the rocker device 10 may adjust the reset force more evenly.

A connection mode between the adjusting part 311 and the connecting part 312 includes but is not limited to welding, bonding, etc. In an embodiment, the adjusting part 311 and the connecting part 312 are formed in one body.

As illustrated in FIGS. 1 to 3, in an embodiment, the rocker device 10 includes a support base 5. The support base 5 is configured to provide support for the entire rocker device 10. The connecting part 312 passes through the second end 22 and is connected to the support base 5 in a threaded connection. Through the above settings, when the toggle component 4 drives the adjusting part 311 and the connecting part 312 to rotate through meshing, due to the threaded connection between the connecting part 312 and the support base 5, the connecting part 312 converts the rotating motion into a motion of approaching or moving away from the support base 5, so that the adjusting part 311 may be close to or away from the second end 22. When the adjusting part 311 stops rotating, the threads of the connecting part 312 may be naturally locked, thereby preventing the adjusting part 311 from being pulled out along the axis and moving. The rocker device 10 may conveniently adjust the operating force.

In an embodiment, the adjustable reset assembly 3 includes a reset component 32. The reset component 32 is disposed between the adjusting component 31 and the second end 22. The reset component 32 applies the reset force to the second end 22. One end of the reset component 32 is connected to the adjusting component 31, and the other end of the reset component 32 is connected to the second end 22.

When the adjusting component 31 is close to the second end 22, the reset force applied by the reset component 32 to the second end 22 increases. When the adjusting component 31 is away from the second end 22, the reset force applied by the reset component 32 to the second end 22 reduces.

Through the above settings, the reset component 32 is directly disposed between the adjusting component 31 and the second end 22. The adjustable reset assembly 3 may directly apply the reset force to the second end 22 through the reset component 32, and the reset force may be changed by adjusting a state of the reset component 32. Thus, the rocker device 10 is easy to adjust.

The reset component 32 may include but not limited to a spring, a magnet, etc., as long as the reset component 32 may apply the reset force to the second end 22.

Figure 4:
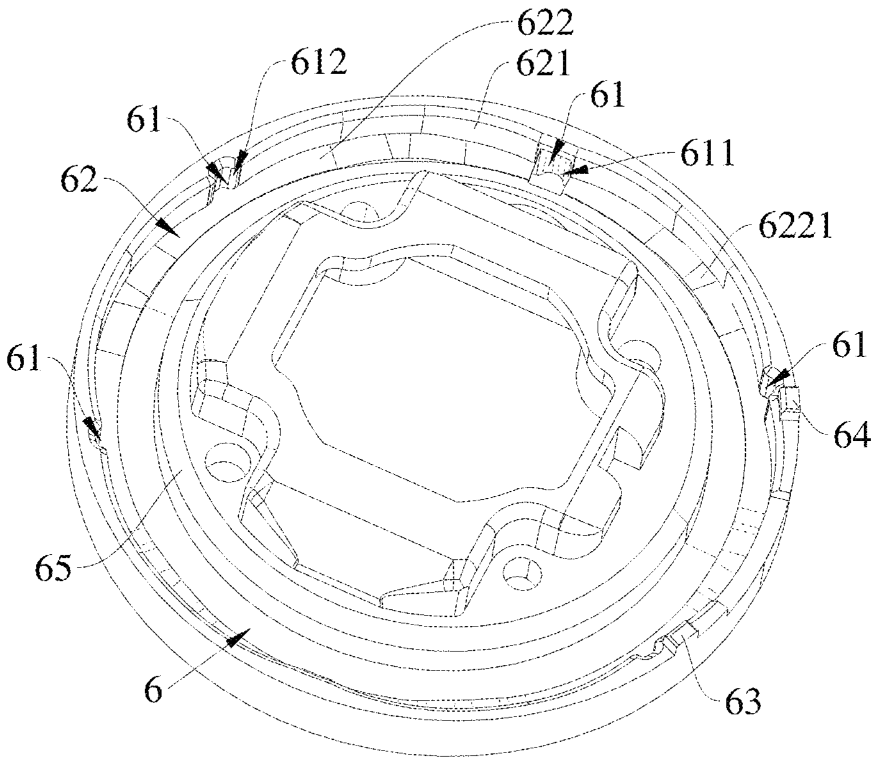
FIG. 4 is a first structural schematic view of an upper cover in an embodiment of the present disclosure.
Figure 5:
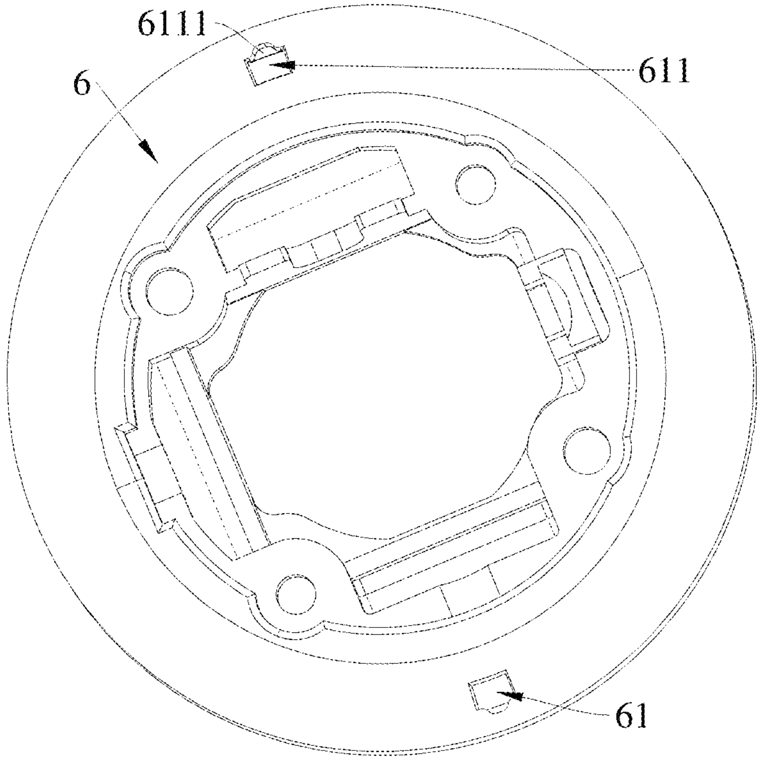
FIG. 5 is a second structural schematic view of the upper cover in an embodiment of the present disclosure.
Figure 6:
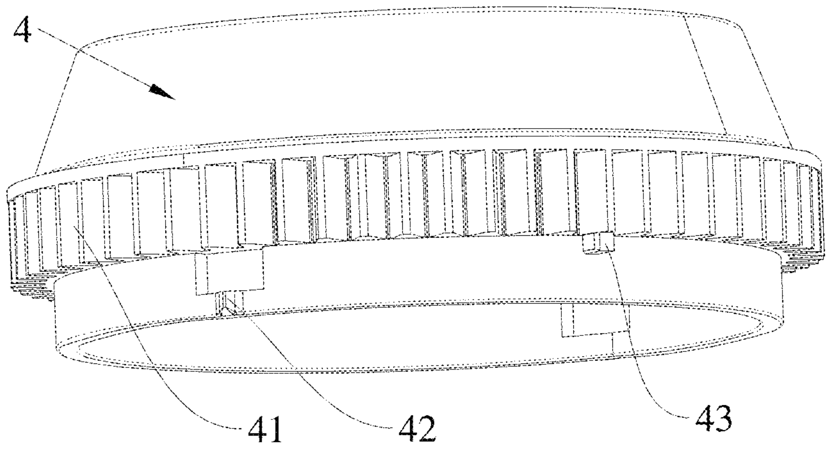
FIG. 6 is a structural schematic view of a toggle component in an embodiment of the present disclosure.

As illustrated in FIGS. 4 to 6, FIG. 4 is a first structural schematic view of an upper cover in an embodiment of the present disclosure, FIG. 5 is a second structural schematic view of the upper cover in an embodiment of the present disclosure, and FIG. 6 is a structural schematic view of a toggle component in an embodiment of the present disclosure. As illustrated in FIGS. 1 to 3, in an embodiment, the rocker device 10 includes the support base 5 and an upper cover 6. The support base 5 is configured to provide support for the entire rocker device 10. The upper cover 6 is disposed on the support base 5. The upper cover 6 and the toggle component 4 are coaxial and sleeved on the rocker 1. The toggle component 4 is located on a side of the upper cover 6 away from the bias component 2. The toggle component 4 is rotatably connected to the upper cover 6.

Through the above settings, toggling may be implemented in an upper position of the structure of the rocker device 10, which is conductive for the user to directly operate the toggle component 4. Furthermore, the user may directly rotate the toggle component 4 to adjust the reset force, and the rocker device 10 adjusts the operating force more simply.

In an embodiment, one or more gear protrusions 42 are disposed around the periphery of the toggle component 4. The gear protrusion 42 protrudes from a surface of the toggle component 4. A plurality of gear slots 61 are spaced apart from each other and disposed on an inner wall of the upper cover 6. The plurality of gear slots 61 may accommodate the gear protrusion 42. The gear protrusion 42 may be detachably embedded in the plurality of gear slots 61.

When the toggle component 4 rotates, the gear protrusion 42 is not embedded in the gear slot 61, and the gear protrusion 42 rotates with the toggle component 4. The gear protrusion 42 may be rotated to another gear slot 61 and re-embedded in this gear slot 61. The setting position of the gear slot 61 may correspond to the position of the adjusting component 31. For example, when the gear protrusion 42 is embedded in different gear slots 61, the adjustable reset assembly 3 may have different reset forces.

Through the above settings, when the user rotates the toggle component 4 to adjust the reset force, an embedding relationship between the gear protrusion 42 and the gear slot 61 may form force feedback. The user may judge the current reset force based on an embedding status of the gear protrusion 42 in the gear slot 61. The rocker device 10 may have a plurality of operating force gears for easy adjustment.

The number of the gear protrusions 42 may be one, two, three, or more, etc., which is not limited in the present disclosure. The number of gear slots 61 may be one, two, three, or more, etc., and the number of gear slots 61 is greater than or equal to the number of gear protrusions 42.

A distance between two adjacent gear slots 61 may be the same or different. The position of the gear protrusion 42 is matched with the position of the gear slot 61. The toggle component 4 may be rotated to at least one specific position, so that each gear protrusion 42 is embedded in the gear slot 61.

As illustrated in FIGS. 1 to 6, in an embodiment, an accommodating groove 62 is defined on the side of the upper cover 6 away from the bias component 2. The toggle component 4 is installed in the accommodating groove 62. The accommodating groove 62 includes a bottom wall 622 and a side wall 621. The side wall 621 surrounds the bottom wall 622 to form the accommodating groove 62. The driving component is adhered to the bottom wall 622 and the side wall 621. The plurality of gear slots 61 are spaced apart from each other and disposed on the side wall 621. A support protrusion 6221 is disposed on the bottom wall 622 and is between two adjacent gear slots 61. The support protrusion 6221 protrudes from the bottom wall 622 in a direction away from the bias component 2. The support protrusion 6221 may support the toggle component 4. The toggle component 4 contacts with the support protrusion 6221, but does not contact with the bottom wall 622.

Through the above settings, the toggle component 4 is installed in the accommodating groove 62 and rotates, thereby making the installation of the toggle component 4 more stable. Furthermore, the toggle component 4 is supported by the supporting protrusion 6221, and there is only a small contact area between the toggle component 4 and the supporting protrusion 6221. When the toggle component 4 rotates, there is no need to generate surface friction with the entire bottom wall 622, and a rotational friction force is smaller. Thus, the adjustment of the operating force of the rocker device 10 may be smoother.

In an embodiment, the plurality of gear slots 61 include a first gear slot 611 and a second gear slot 612. The first gear slot 611 and the second gear slot 612 are spaced apart from each other. The first gear slot 611 and the second gear slot 612 extend along the axial direction of the upper cover 6. A limit wall 6111 is disposed at one end of the first gear slot 611 away from the bias component 2. When the gear protrusion 42 is embedded in the first gear slot 611, the gear protrusion 42 is limited and located on the limit wall 6111 along the axial direction of the upper cover 6. When the gear protrusion 42 is embedded in the second gear slot 612, the gear protrusion 42 may move along the axial direction of the upper cover 6.

Through the above settings, the toggle component 4 may be installed into the upper cover 6 through the second gear slot 612, and may be locked onto the upper cover 6 through the first gear slot 611. Thus, it is easy to install the toggle component 4.

In an embodiment, the toggle component 4 is equipped with a first rotation limit part 43. The first rotation limit part 43 is disposed on the periphery of the toggle component 4. The upper cover 6 is equipped with a second rotation limit part 63 and a third rotation limit part 64. The second rotation limit part 63 and the third rotation limit part 64 are spaced apart from each other and disposed on the upper cover 6.

The adjusting component 31 may be located in a first position and a second position. The first position may be the position where the adjusting component 31 is farthest from the second end 22. The second position may be the position where the adjusting component 31 is closest to the second end 22. When the adjusting component 31 moves to the first position, the first rotation limit part 43 is limited to the second rotation limit part 63, and the toggle component 4 cannot further rotate. When the adjusting component 31 moves to the second position, the first rotation limit part 43 is limited to the third rotation limit part 64, and the toggle component 4 cannot further rotate.

Through the above settings, the second rotation limit part 63 and the third rotation limit part 64 may respectively limit the first rotation limit part 43, and the toggle component 4 may only rotate in the range of the second rotation limit part 63 to the third rotation limit part 64. The toggle component 4 is not easy to excessively rotate, thereby avoiding damage to the adjustable reset assembly 3. Thus, the rocker device 10 is not easily damaged.

As illustrated in FIGS. 1 to 6, in an embodiment, the rocker device 10 further includes a rocker cap 7. The rocker cap 7 may be configured to decorate and protect the rocker 1. The rocker cap 7 is sleeved on the rocker 1. The rocker cap 7 is located on the side of the upper cover 6 away from the bias component 2. A side of the rocker cap 7 facing towards the upper cover 6 defines an avoidance groove 71. A limit protrusion 711 is disposed on the circumference of an inner wall of the avoidance groove 71. The limit protrusion 711 is tilted and extends along a direction from the inner wall of the avoidance groove 71 to the upper cover 6. An abutting part 65 is disposed on the circumference of a side of the upper cover 6 facing towards the rocker cap 7. When the rocker 1 is tilted to a preset angle, the limit protrusion 711 is abutted against the abutting part 65. The preset angle refers to the maximum offset angle of the rocker 1 when rocker 1 is operated. The preset angles may be 30 degrees, 40 degrees, 50 degrees, 60 degrees, etc., which are not limited in the present disclosure.

Through the above settings, when the rocker 1 is pushed to the preset angle, the limit protrusion 711 is in contact with the abutting part 65, so that the rocker 1 cannot be further pushed, achieving the limit of the rocker 1. Furthermore, since the limit protrusion 711 is located on the inner wall of the avoidance groove 71, an edge of the rocker cap 7 cannot be contact with the upper cover 6. Thus, the edge of the rocker cap 7 is not easy to wear, which increases the service life of the rocker device 10.

Figure 7:
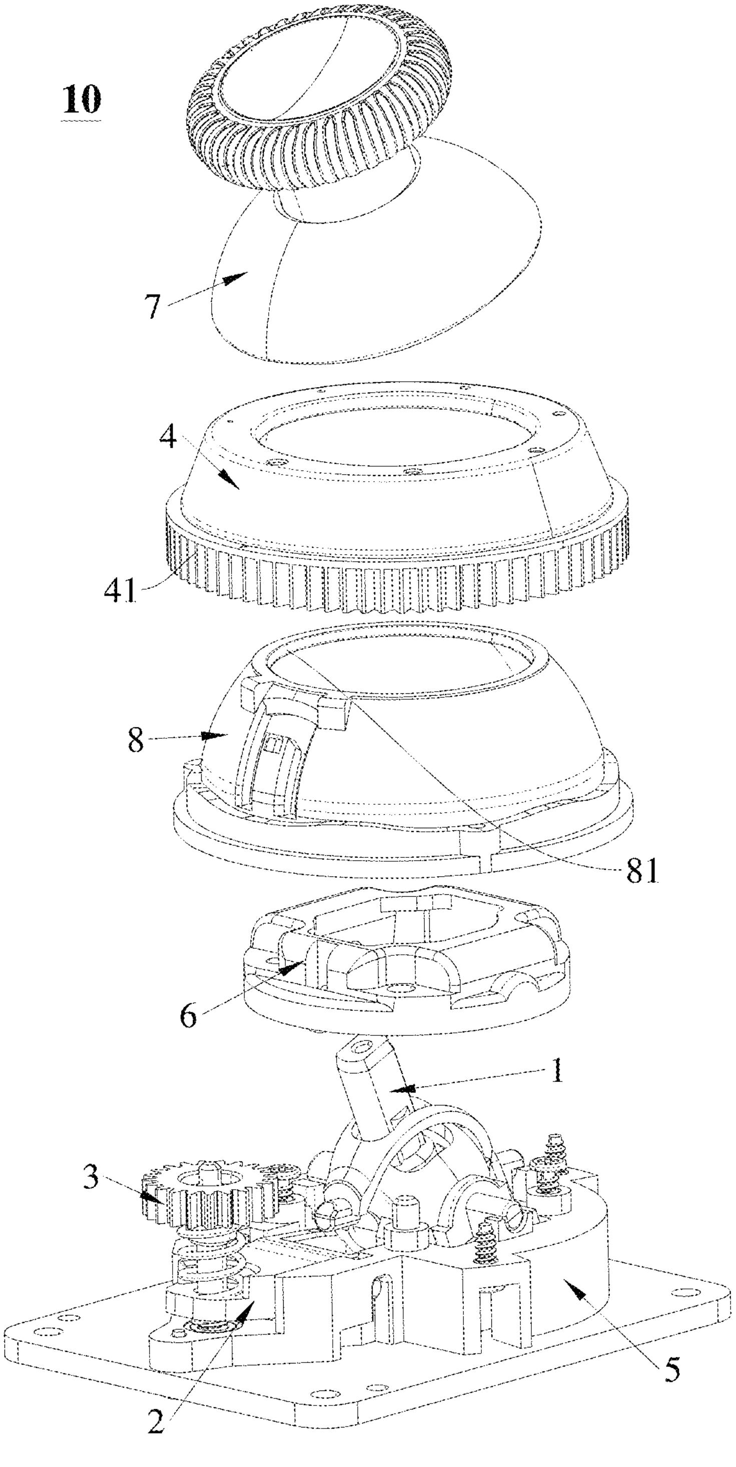
FIG. 7 is an exploded schematic view of the rocker device in another embodiment of the present disclosure.
Figure 8:
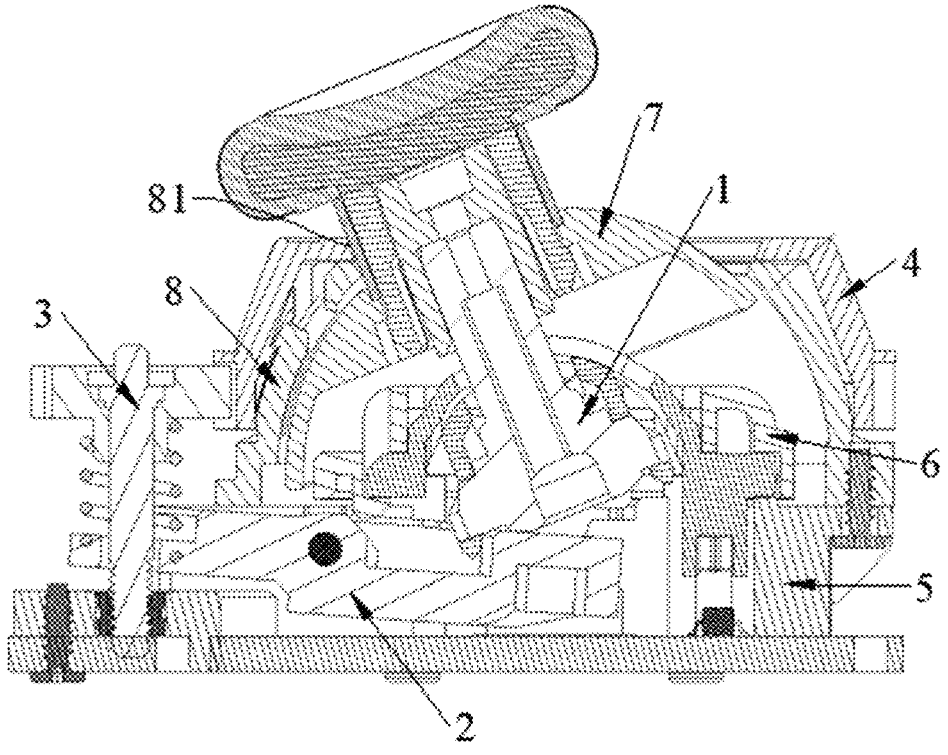
FIG. 8 is a cross-sectional schematic view of the rocker device in another embodiment of the present disclosure.

As illustrated in FIGS. 7 to 8, FIG. 7 is an exploded schematic view of the rocker device in another embodiment of the present disclosure, and FIG. 8 is a cross-sectional schematic view of the rocker device in another embodiment of the present disclosure. As illustrated in FIGS. 1 to 6, in another embodiment, the rocker device 10 further includes the support base 5, the upper cover 6, and a limit ring 8. The support base 5 is configured to provide support for the entire rocker device 10. The upper cover 6 and the limit ring 8 are disposed on the support base 5. The upper cover 6, the limit ring 8, and the toggle component 4 are coaxial and sleeved on the rocker rod 1. The limit ring 8 is located on the side of the upper cover 6 away from the bias component 2. The toggle component 4 is located on the side of the limit ring 8 away from the bias component 2. The limit ring 8 is fixed relative to the support base 5. The toggle component 4 is rotationally connected to the limit ring 8. Through the above settings, the toggle component 4 may be installed through the limit ring 8, and the installation mode of the toggle component 4 is flexible.

A connection method between the limit ring 8 and the toggle component 4 may be axial snap connection, etc. As long as the toggle component 4 may rotate and be fixed along the axial direction, which is not limited in the present disclosure.

In an embodiment, the gear protrusion 42 may be disposed around the periphery of the limit ring 8. The inner wall of the toggle component 4 may be equipped with the gear slot 61. The gear protrusion 42 may be embedded in the gear slot 61 in a removable manner. When the toggle component 4 rotates to the limit ring 8, the gear protrusion 42 is not embedded in the gear slot 61. The gear protrusion 42 rotates with the toggle component 4 and may be re-embedded in another gear slot 61. Thus, the related structure of the toggle component 4 and the limit ring 8 may also achieve gear adjustment effect. The user may judge the current reset force based on the embedding status of the gear protrusion 42 in the gear slot 61. It is easy to adjust the rocker device 10.

In an embodiment, the rocker device 10 further includes the rocker cap 7. The rocker cap 7 may be configured to decorate and protect the rocker 1. The rocker cap 7 is sleeved on the rocker 1. The rocker cap 7 is disposed between the upper cover 6 and the limit ring 8. When the rocker 1 is offset, the rocker cap 7 moves between the upper cover 6 and the limit ring 8 with the rocker 1. The limit ring 8 includes a limit surface 81 that surrounds the rocker 1. When the rocker 1 is tilted to the preset angle, the periphery of the rocker cap 7 is abutted against the limit surface 81. The preset angle refers to the maximum offset angle of the rocker 1 when the rocker 1 is operated.

Through the above settings, when the rocker 1 is pushed to the preset angle, an outer surface of rocker cap 7 is in contact with the limit ring 8, preventing the rocker 1 from being further pushed, achieving the limit of the rocker 1. The limit structure is simple, and the rocker device 10 is compact in structure.

When the rocker 1 is tilted, the rocker 1 may not only be limited by the limit ring 8 in the above embodiments, but also be limited by being in contact with the structures such as the toggle component 4 and the upper cover 6, etc. In an embodiment, when the rocker 1 is tilted to the preset angle, the periphery of the rocker cap 7 is abutted against the inner wall of the toggle component 4 facing towards the rocker 1. In another embodiment, when the rocker 1 is tilted to the preset angle, the periphery of the rocker cap 7 is abutted against the inner wall of the upper cover 6 facing towards the rocker 1.

The effects of the present disclosure are as follows. Different from the existing technologies, the present disclosure provides the rocker device 10. The rocker device 10 includes the rocker 1, the bias component 2, the adjustable reset assembly 3, and the toggle component 4. The rocker 1 is equipped with the pressing part 11. The bias component 2 includes the first end 21 and the second end 22 opposite to each other. The first end 21 is in contact with the pressing part 11. The second end 22 may be capable of offsetting. The adjustable reset assembly 3 is disposed on the second end 22, and is configured to drive the second end 22 of the bias component 2 to reset. The rocker 1 rotates inside the toggle component 4. The toggle component 4 acts on the adjustable reset assembly 3 to adjust the reset force. Through the above settings, the reset force applied by the adjustable reset assembly 3 to the second end 22 may be adjusted by the toggle component 4, thereby causing a change in the reset force transmitted from the second end 22 to the first end 21. When the rocker 1 is operated, the force feedback from the first end 21 changes accordingly. The operating force of the rocker device 10 may be flexibly adjusted to meet the diverse experience needs of the user.

The terms “first”, “second”, and “third” in the present disclosure are only configured to describe purposes and cannot be understood as indicating the quantity of technical features indicated. Therefore, features limited to “first”, “second”, and “third” may explicitly or implicitly include at least one of these features. All directional indications (such as up, down, left, right, front, rear, or the like) in some embodiments of the present disclosure are only configured to explain a relative position relationship between components in a specific posture (as shown in the accompanying drawings), a motion situation between the components in the specific posture (as shown in the accompanying drawings), or the like. If the specific posture is changed, the directional indication is also changed accordingly. In addition, the terms “including”, “comprising”, and “having”, as well as any variations of the terms “including”, “comprising”, and “having”, are intended to cover non-exclusive inclusions. For example, a process, method, system, product, or device that includes a series of operations or units is not limited to the listed operations or units, but optionally includes operations or units that are not listed, or optionally includes other operations or units that are inherent to these processes, methods, products, or devices.

The above description are only some embodiments of the present disclosure, and are not intended to limit the scope of the present disclosure. Any equivalent structure or equivalent flow transformation made by using the contents of the specification and accompanying drawings of the present disclosure, or directly or indirectly applied to other related technical fields, is included in the scope of the patent protection of the present disclosure.

What is claimed is:

1. A rocker device, comprising: a rocker, provided with a pressing part; a bias component, comprising a first end and a second end opposite to each other, wherein the first end is in contact with the pressing part, and the second end is capable of offsetting; an adjustable reset assembly, disposed on the second end, wherein the adjustable reset assembly is configured to drive the second end of the bias component to reset; and a toggle component, wherein the rocker is configured to rotate in the toggle component, and the toggle component is configured to act on the adjustable reset assembly to adjust a reset force; wherein the adjustable reset assembly comprises an adjusting component that is spaced apart from the second end; and the adjusting component and the toggle component mesh with each other in a lockable manner; wherein a first meshing part is disposed on a periphery of the toggle component, a second meshing part is disposed on a periphery of the adjusting component, and the first meshing part meshes with the second meshing part.

2. The rocker device according to claim 1, wherein the adjusting member comprises an adjusting part and a connecting part, wherein one end of the connecting part is equipped with the adjusting part, the other end of the connecting part passes through the second end, and the second meshing part is disposed on a periphery of the adjusting part.

3. The rocker device according to claim 2, further comprising a support base, wherein the connecting part passes through the second end and is connected to the support base.

4. The rocker device according to claim 1, wherein the adjustable reset assembly comprises a reset component, the reset component is disposed between the adjusting component and the second end, one end of the reset component is connected to the adjusting component, and the other end of the reset component is connected to the second end.

5. The rocker device according to claim 1, further comprising a support base and an upper cover, wherein the upper cover is disposed on the support base, the upper cover and the toggle component are coaxial and sleeved on the rocker, the toggle component is located on a side of the upper cover away from the bias component, and the toggle component is rotatably connected to the upper cover.

6. The rocker device according to claim 5, wherein a gear protrusion is disposed on a periphery of the toggle component, a plurality of gear slots are spaced apart from each other and disposed on an inner wall of the upper cover, and the gear protrusion is detachably embedded in one of the plurality of gear slots.

7. The rocker device according to claim 6, wherein an accommodating groove is defined on the side of the upper cover away from the bias component, and the toggle component is installed in the accommodating groove; the accommodating groove comprises a bottom wall and a side wall, and the plurality of gear slots are spaced apart from each other and disposed on the side wall; and a support protrusion is disposed on the bottom wall and between adjacent two of the plurality of gear slots, and the support protrusion is configured to support the toggle component.

8. The rocker device according to claim 6, wherein the plurality of gear slots comprise a first gear slot and a second gear slot, the first gear slot and the second gear slot extend along an axial direction of the upper cover, a limit wall is disposed on one end of the first gear slot away from the bias component, and the gear protrusion is limited to the limit wall along the axial direction of the upper cover.

9. The rocker device according to claim 5, wherein a first rotation limit part is disposed on the toggle component, and a second rotation limit part and a third rotation limit part are disposed on the upper cover; and the adjusting component is located in a first position and a second position; when the adjusting component moves to the first position, the first rotation limit part is limited to the second rotation limit part; and when the adjusting component moves to the second position, the first rotation limit part is limited to the third rotation limit part.

10. The rocker device according to claim 5, further comprising a rocker cap, wherein the rocker cap is sleeved on the rocker, and the rocker cap is located on the side of the upper cover away from the bias component;

an avoidance groove is defined on a side of the rocker cap facing towards the upper cover, a limit protrusion is disposed on a circumference of an inner wall of the avoidance groove, an abutting part is disposed on a circumference of a side of the upper cover facing towards the rocker cap; and when the rocker is tilted to a preset angle, the limit protrusion is abutted against the abutting part.

11. The rocker device according to claim 1, further comprising a support base, an upper cover, and a limit ring; wherein the upper cover and the limit ring are disposed on the support base; the upper cover, the limit ring, and the toggle component are coaxial and sleeved on the rocker; and the limit ring is located on a side of the upper cover away from the bias component, the toggle component is located on a side of the limit ring away from the bias component, and the toggle component is rotatably connected to the limit ring.

12. The rocker device according to claim 11, further comprising a rocker cap, wherein the rocker cap is sleeved on the rocker, and the rocker cap is disposed between the upper cover and the limit ring; and the limit ring comprises a limit surface surrounding the rocker, and when the rocker is tilted to a preset angle, a periphery of the rocker cap is abutted against the limit surface.

13. A rocker device, comprising: a rocker, provided with a pressing part; a rocker cap, sleeved on the rocker; a bias component, comprising a first end and a second end opposite to each other, wherein the first end is in contact with the pressing part, and the second end is capable of offsetting; an adjustable reset assembly, disposed on the second end, wherein the adjustable reset assembly is configured to drive the second end of the bias component to reset, the adjustable reset assembly comprises an adjusting component and a reset component, and the reset component is disposed between the adjusting component and the second end; and a toggle component, wherein the rocker is configured to rotate in the toggle component, and the toggle component is configured to act on the adjustable reset assembly to adjust a reset force; wherein the adjusting component and the toggle component mesh with each other in a lockable manner; wherein a first meshing part is disposed on a periphery of the toggle component, a second meshing part is disposed on a periphery of the adjusting component, and the first meshing part meshes with the second meshing part.

14. The rocker device according to claim 13, wherein the adjusting member comprises an adjusting part and a connecting part, wherein one end of the connecting part is equipped with the adjusting part, the other end of the connecting part passes through the second end, and the second meshing part is disposed on a periphery of the adjusting part.

15. The rocker device according to claim 14, further comprising a support base, wherein the connecting part passes through the second end and is connected to the support base.

16. The rocker device according to claim 13, further comprising a support base and an upper cover, wherein the upper cover is disposed on the support base, the upper cover and the toggle component are coaxial and sleeved on the rocker, the toggle component is located on a side of the upper cover away from the bias component, and the toggle component is rotatably connected to the upper cover.

* * * * *